United States Patent
Innilä et al.

(10) Patent No.: US 11,104,541 B2
(45) Date of Patent: Aug. 31, 2021

(54) EQUIPMENT FOR ATTACHING AN OPTICAL FIBER TO A REEL

(71) Applicant: Rosendahl Nextrom GmbH, Pischelsdorf (AT)

(72) Inventors: Matti Innilä, Vantaa (FI); Jukka Mönkkönen, Vantaa (FI); Touko Liikonen, Helsinki (FI)

(73) Assignee: ROSENDAHL NEXTROM GMBH, Pischelsdorf (AT)

( * ) Notice: Subject to any disclaimer, the term of this patent is extended or adjusted under 35 U.S.C. 154(b) by 0 days.

(21) Appl. No.: 16/406,561

(22) Filed: May 8, 2019

(65) Prior Publication Data

US 2019/0344993 A1     Nov. 14, 2019

(30) Foreign Application Priority Data

May 8, 2018 (FI) ..................... 20185425

(51) Int. Cl.
*B65H 65/00* (2006.01)
*B65H 54/00* (2006.01)
(Continued)

(52) U.S. Cl.
CPC ............ *B65H 65/00* (2013.01); *B65H 54/28* (2013.01); *B65H 67/0411* (2013.01);
(Continued)

(58) Field of Classification Search
CPC .... B65H 65/00; B65H 2701/32; B65H 75/28; B29C 63/06; B29C 63/10; B29C 63/14;
(Continued)

(56) References Cited

U.S. PATENT DOCUMENTS 3,836,086 A    9/1974 Kodama
4,032,076 A    6/1977 Kogos et al.
(Continued)

FOREIGN PATENT DOCUMENTS

DE    27 55 813 A1    7/1978
DE    44 11 698 A1    10/1995
(Continued)

OTHER PUBLICATIONS

Finnish Search Report dated Dec. 3, 2018, issued by the European Patent Office in the corresponding Finnish Patent Application No. 20185425.
(Continued)

*Primary Examiner* — Linda L Gray
(74) *Attorney, Agent, or Firm* — Buchanan Ingersoll & Rooney PC

(57) ABSTRACT

An equipment is disclosed for attaching an optical fiber to a reel, the equipment including a tape supply station configured to cut and supply pieces of tape, an attachment device having a frame with a collector for collecting a piece of tape from the tape supply station for attaching the optical fiber to the reel, an actuator for moving the attachment device and for pressing the collector, having the piece of tape, against the optical fiber and the reel in order to attach the optical fiber to the reel, and a cutter for cutting the optical fiber. Such an equipment can be advantageous as manual labour can be excluded from the process of attaching an optical fiber to a reel.

9 Claims, 8 Drawing Sheets

(51) Int. Cl.
    *B65H 67/00*   (2006.01)
    *B65H 75/00*   (2006.01)
    *B29C 63/00*   (2006.01)
    *B32B 38/00*   (2006.01)
    *B65H 54/28*   (2006.01)
    *B65H 67/04*   (2006.01)
    *B29C 63/14*   (2006.01)
    *B65H 75/28*   (2006.01)
    *B29C 63/10*   (2006.01)
    *B29C 63/06*   (2006.01)

(52) U.S. Cl.
    CPC .......... *B65H 67/0417* (2013.01); *B29C 63/06* (2013.01); *B29C 63/10* (2013.01); *B29C 63/14* (2013.01); *B32B 38/0004* (2013.01); *B65H 75/28* (2013.01); *B65H 2701/32* (2013.01); *Y10T 156/1062* (2015.01); *Y10T 156/12* (2015.01)

(58) Field of Classification Search
    CPC . B29C 53/562; B32B 43/003; B32B 38/0004; Y10T 156/12; Y10T 156/1062
    USPC ....... 156/187, 446, 447, 448, 449, 450, 457, 156/174, 175
    See application file for complete search history.

(56)        References Cited

U.S. PATENT DOCUMENTS

| 4,441,660 | A  | 4/1984  | Cloud et al.    |
| 4,610,404 | A  | 9/1986  | Maccaferri      |
| 5,322,228 | A  | 6/1994  | Nagayama et al. |
| 5,441,215 | A  | 8/1995  | Nagayama et al. |
| 5,472,128 | A  | 12/1995 | Nagayama et al. |
| 6,508,113 | B1 | 1/2003  | Rogerson et al. |
| 2019/0344992 | A1 | 11/2019 | Innilä et al. |

FOREIGN PATENT DOCUMENTS

| EP | 0142813       | A2 | 5/1985  |
| JP | S 49-50241    | A  | 5/1974  |
| JP | S49-127179    | A  | 12/1974 |
| JP | S51-017692    | U  | 2/1976  |
| JP | S58-193866    | A  | 11/1983 |
| JP | S59-114265    | A  | 7/1984  |
| JP | S64-053990    | A  | 3/1989  |
| JP | H 04-130271   | U  | 11/1992 |
| JP | H 05-170476   | A  | 7/1993  |
| JP | H05-193976    | A  | 8/1993  |
| JP | 5-310370      | A  | 11/1993 |
| JP | H 05-310370   | A  | 11/1993 |
| JP | 7-115800      | B2 | 12/1995 |
| JP | H 11-255433   | A  | 9/1999  |
| JP | H11255430     | A  | 9/1999  |
| JP | 2002018518    | A  | 1/2002  |
| JP | 2007-099461   | A  | 4/2007  |
| JP | 2015063365    | A  | 4/2015  |
| KR | 1997-0000134  | B1 | 12/1992 |
| RU | 2 209 784     | C2 | 8/2003  |
| WO | 02-22484      | A1 | 3/2002  |
| WO | 2015-045646   | A1 | 4/2015  |

OTHER PUBLICATIONS

Finnish Search Report dated Dec. 5, 2018, issued by the European Patent Office in the corresponding Finnish Patent Application No. 20185426.
The extended European Search Report dated Jul. 29, 2019, by the European Patent Office in corresponding European Application No. 19172817.9. (8 pages).
Office Action (Notice of Grounds for Rejection) dated Jun. 22, 2020, by the Korean Patent Office in corresponding Korean Patent Application No. 10-2019-0052050, and an English Translation of the Office Action. (8 pages).
The extended European Search Report dated Aug. 27, 2019, by the European Patent Office in corresponding European Application No. 19172821.1. (6 pages).
International Search Report (Form PCT/ISA/210) dated Jul. 29, 2019, by the European Patent Office in corresponding International Application No. PCT/EP2019/061559. (5 pages).
International Search Report (Form PCT/ISA/210) dated Jul. 29, 2019, by the European Patent Office in corresponding International Application No. PCT/EP2019/061568. (5 pages).
Search Report dated Jan. 31, 2020, by the Russian Patent Office in corresponding Russian Patent Application No. 2019112396/10(024041). (2 pages).
Office Action (Notification of Ground(s) for Rejection) dated Aug. 24, 2020, by the Japanese Patent Office in corresponding Japanese Patent Application No. 2019-084964, and an English Translation of the Office Action. (4 pages).
Office Action (Notification of Ground(s) for Rejection) dated Sep. 10, 2020, by the Japanese Patent Office in corresponding Japanese Patent Application No. 2019-084965, and an English Translation of the Office Action. (12 pages).
Office Action (Notice of Grounds for Rejection) dated Jun. 15, 2020, by the Korean Patent Office in corresponding Korean Patent Application No. 10-2019-0052038, and an English Translation of the Office Action. (10 pages).
Office Action (Rejection) dated Jan. 27, 2021, by the U.S. Patent and Trademark Office in U.S Appl. No. 16/403,931.

EQUIPMENT FOR ATTACHING AN OPTICAL FIBER TO A REEL

FIELD OF THE INVENTION

The present invention relates to an equipment for attaching an optical fiber to a reel.

BACKGROUND OF THE INVENTION

Previously, manual labour is involved in attaching an optical fibre to a full or to an empty reel. One of the disadvantages associated with the above arrangement is that manually attaching an optical fiber to a reel is time consuming.

BRIEF DESCRIPTION OF THE INVENTION

It is thus an object of the present invention to provide an equipment for attaching an optical fiber to a reel so as to overcome at least some of the above problems. The objects of the invention are achieved by a device which is characterized by what is stated in the independent claim 1. The preferred embodiments of the invention are disclosed in the dependent claims.

BRIEF DESCRIPTION OF THE DRAWINGS

In the following the invention will be described in greater detail with reference to the attached accompanying drawings illustrating one embodiment of an equipment for attaching an optical fiber to a reel, in which.

DETAILED DESCRIPTION OF THE INVENTION

Figure 1:
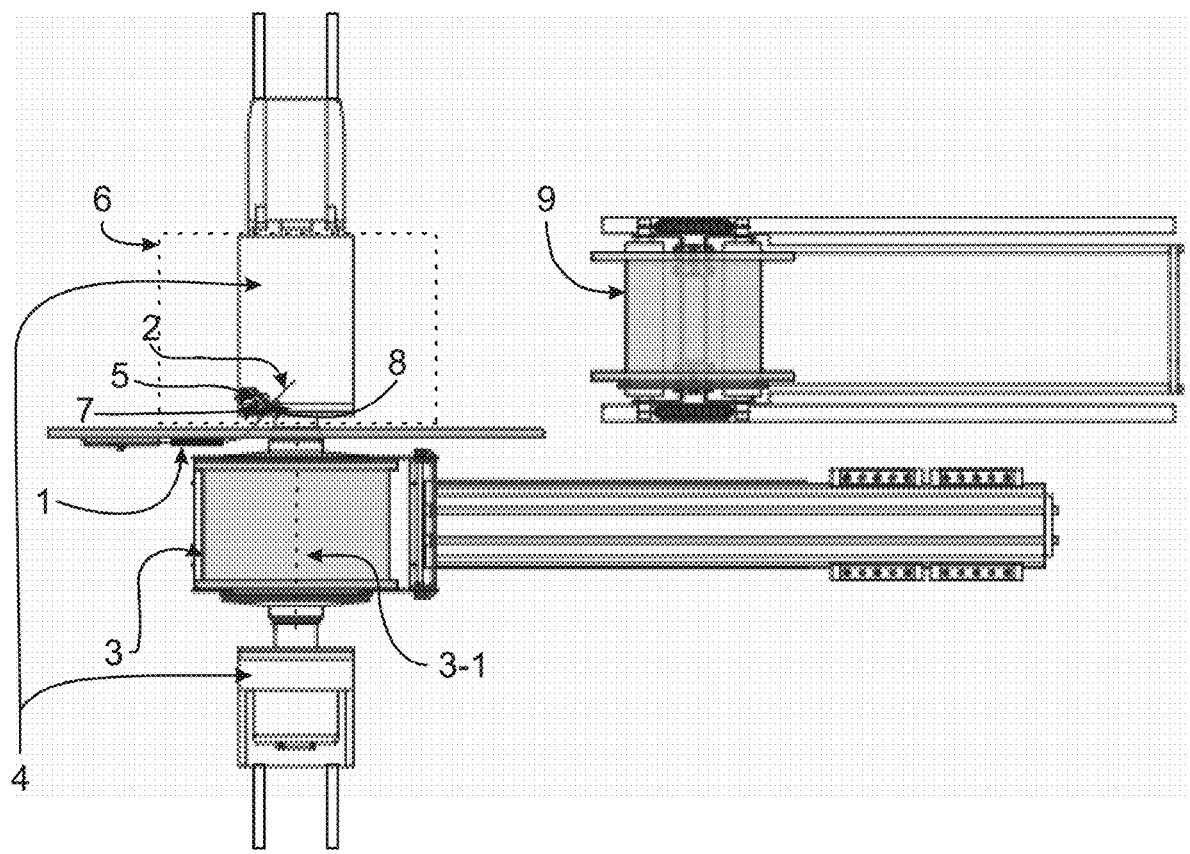
FIG. 1 is an overall drawing of a single-reel winding device.

FIG. 1 is an overall drawing of a single-reel winding device comprising a distributor wheel 1 for distributing an optical fiber 2 to a first reel 3 for winding the optical fiber 2 and a winder 4. In addition the single-reel winding device comprises an attachment device 5 for attaching the optical fiber 2 to the first reel 3 when the first reel 3 is in the exchange area 6, a cutter 7 for cutting the optical fiber 2 when the first reel 3 is full and a gripper 8 for gripping onto the optical fiber 2, provided by the distributor wheel 1, and keeping the optical fiber 2 stationary during attaching and cutting of the optical fiber 2. The gripper 8 also keeps the optical fiber stationary while the first, full reel 3 is removed from the exchange area 6 and a second, empty reel 9 is provided to the exchange area 6 in order to continue winding of the optical fiber 2.

Figure 2:
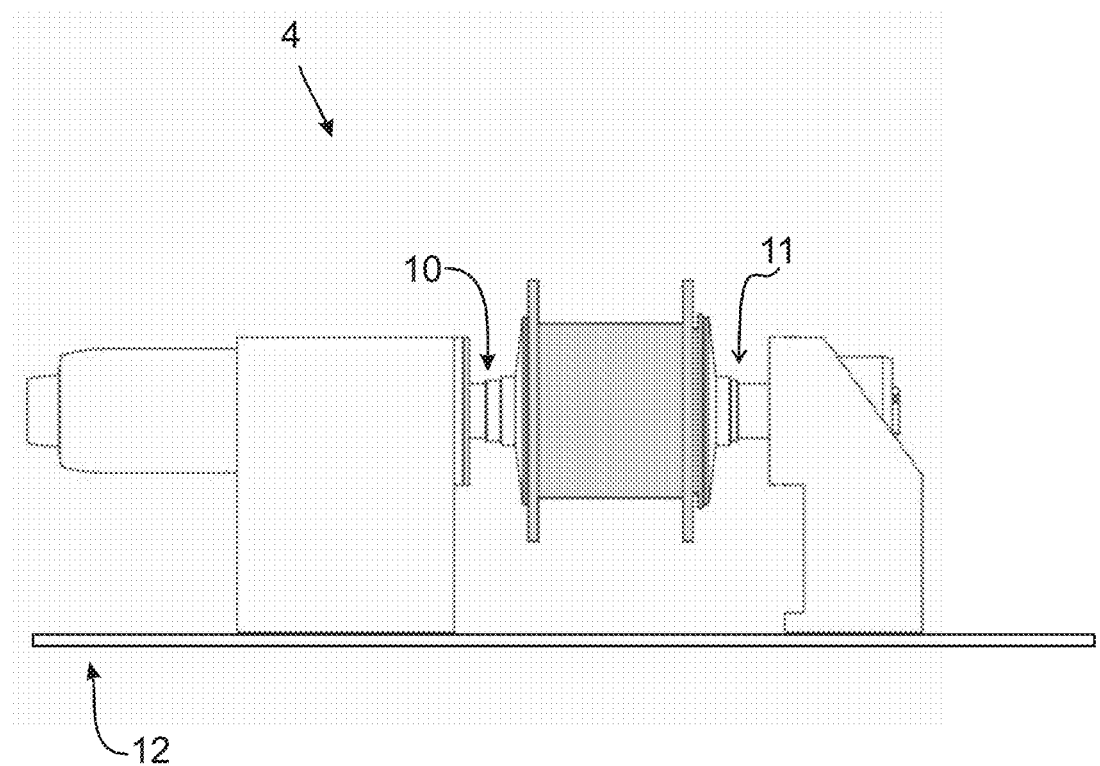
FIG. 2 is a drawing showing an example of a winder.

FIG. 2 is a drawing showing an example of a winder 4. The winder 4 comprises a first rotatable pin 10 and a second rotatable pin 11, which pins 10, 11 are arranged to attach to the first reel 3 for winding the optical fiber 2 on said reel. The winder 4 is arranged movably on guide tracks 12, for revolving the first reel 3 around a center axis 3-1 of the first reel 3 and for moving the first reel 3 along the center axis 3-1 between different positions in order to wind the optical fiber 2 onto the first reel 3, and for moving the first reel 3 to an exchange area 6 when the first reel 3 is full.

Figure 3A:
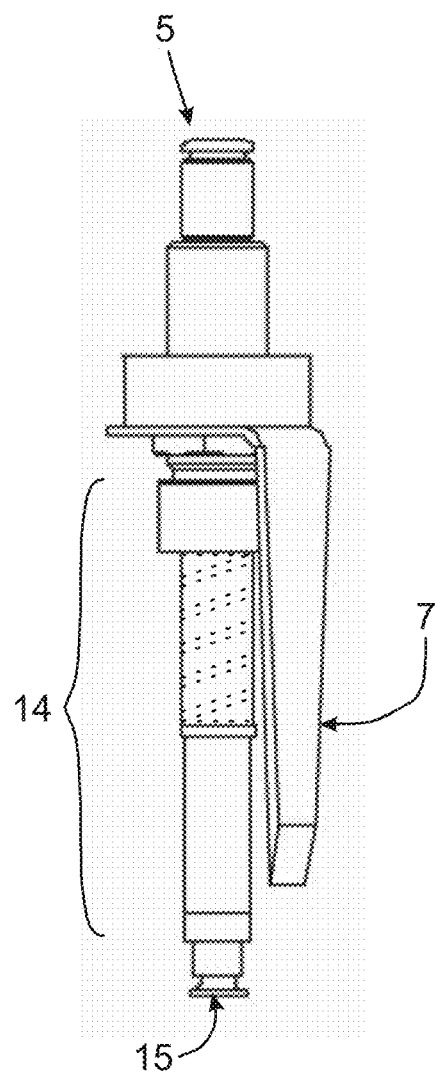
FIGS. 3a and 3b are drawings showing an example of an attachment device and a gripper, respectively.
Figure 3B:
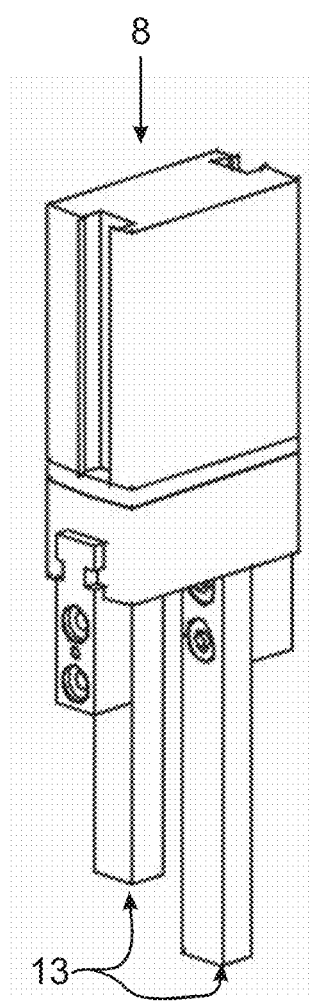

FIGS. 3a and 3b are drawings showing an example of the attachment device 5 and the gripper 8, respectively. FIG. 3a is a drawing showing an example of an attachment device 5. Said attachment device 5 comprises a spring-biased frame 14 compressing the frame when a collector 15 is pressed against the optical fiber 2 and the reel, and said collector 15 for collecting a piece of tape wherein said collector 15 may comprise a suction pad for collecting a piece of tape from the tape supply station 16, for instance. The spring-biased frame 14 may be implemented with a "telescopic" design having two coaxially arranged parts generally tubular parts that are pushed away from each other by a spring in the frame, for instance. The attachment device 5 may be configured to collect a piece of tape from a tape supply station 16, for instance, in order to attach the optical fiber 2 to the reel with said piece of tape. The attachment device 5 may comprise an actuator for moving the attachment device 5 and for pressing the collector 15, having said piece of tape, against the optical fiber 2 and the reel in order to attach said optical fiber 2 to said reel. The attachment device 5 may also comprise a cutter 7. The cutter 7 may, for instance, be a blade, arranged alongside the spring-biased frame 14 of the attachment device 5.

FIG. 3b illustrates that the gripper 8 comprises movable jaws 13 arranged to open and to close for gripping onto the optical fibre 2. In addition, the gripper 8 may comprise an actuator for moving the gripper 8 towards the reel and away from the optical fiber.

Figure 4:
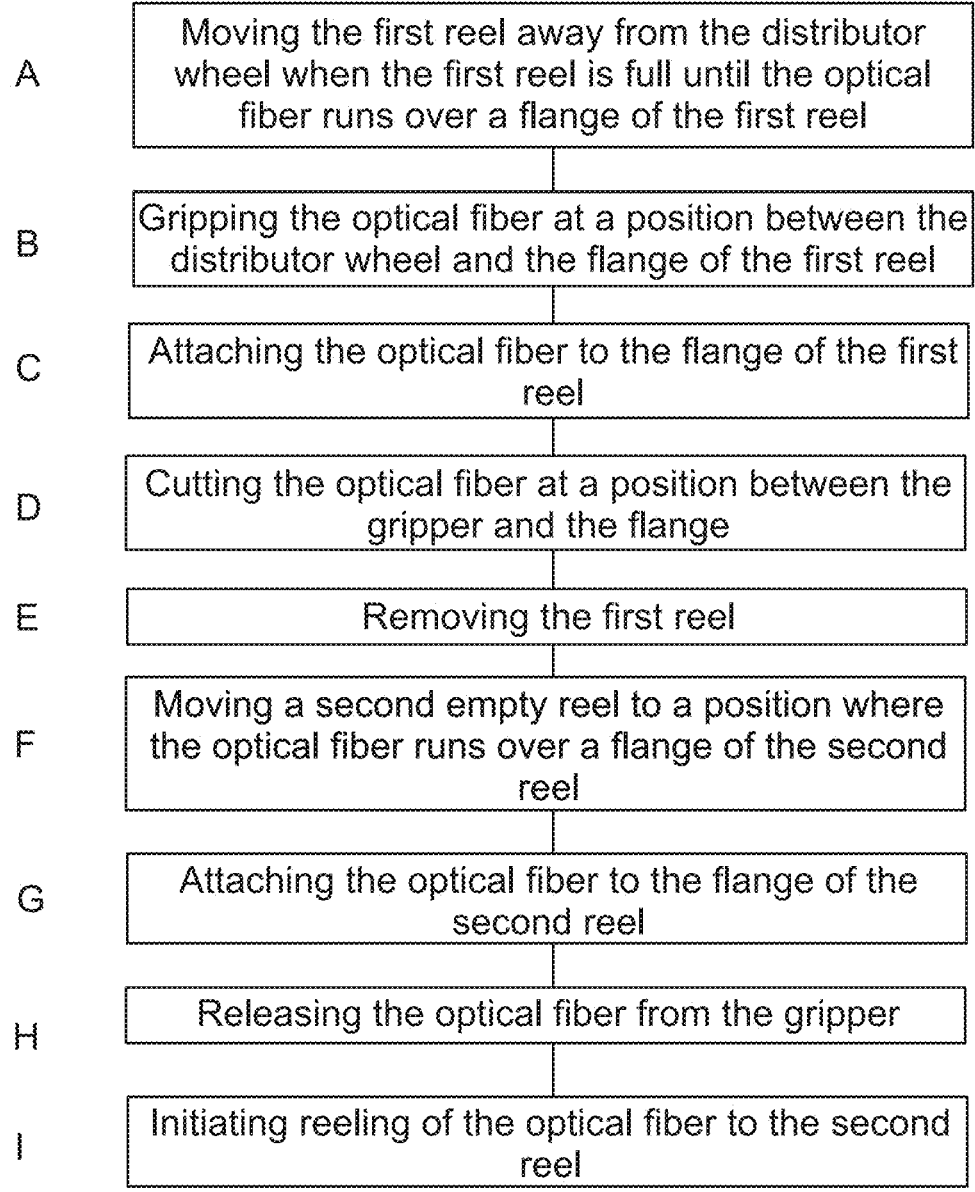
FIG. 4 is a block-diagram of a method for replacing a full first reel in a single-reel winding device.

FIG. 4 shows a block-diagram of a method for replacing a full first reel 3 in a single-reel winding device comprising a distributor wheel 1 for distributing an optical fiber 2 to the first reel 3. Said method comprises (A) moving the first reel 3 away from the distributor wheel 1 when the first reel 3 is full until the optical fiber 2 runs over a flange of the first reel 3, (B) gripping the optical fiber 2 at a position between the distributor wheel 1 and the flange of the first reel 3, (C) attaching the optical fiber 2 to the flange of the first reel 3, (D) cutting the optical fiber 2 at a position between the gripper 8 arid the flange, (E) removing the first reel 3, (F) moving a second empty reel to a position where the optical fiber 2 runs over a flange of the second reel 9, (G) attaching the optical fiber 2 to the flange of the second reel 9, (H) releasing the optical fiber from the gripper 8, and (I) initiating reeling of the optical fiber 2 to the second reel 9.

FIGS. 5-8 further illustrate the method described in FIG. 4. FIGS. 5a and 5b are front-view drawings illustrating the attachment and cutting of the optical fiber 2. In FIG. 5a, the winder 4 is arranged to move the first reel 3 away from the distributor wheel 1 when the first reel 3 is full, such that the gripper 8 can grip the optical fiber 2 at a position between the distributor wheel 1 and a flange of the first reel 3 which is closest to the distributor wheel 1. In other words, when the first reel 3 is full and has been moved to the exchange area 6, the gripper 8, which is situated between a flange of the first reel 3 and the distributor wheel 1, moves towards the optical fiber for gripping onto the optical fiber by closing the movable jaws for keeping the optical fiber stationary. Holding the optical fiber stationary with the gripper 8 is advantageous as the optical fiber cannot escape during a reel exchange and it may be precisely positioned for attaching.

Figure 5A:
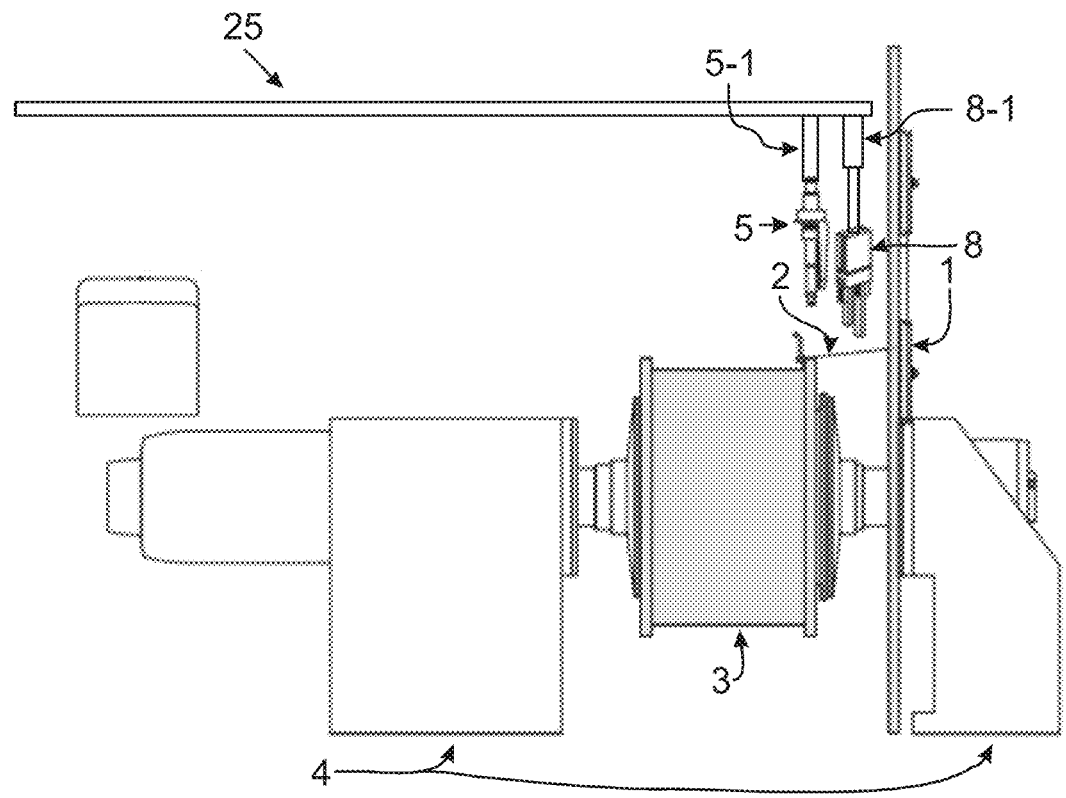
FIGS. 5a and 5b are front-view drawings illustrating the attachment and cutting of the optical fiber.
Figure 5B:
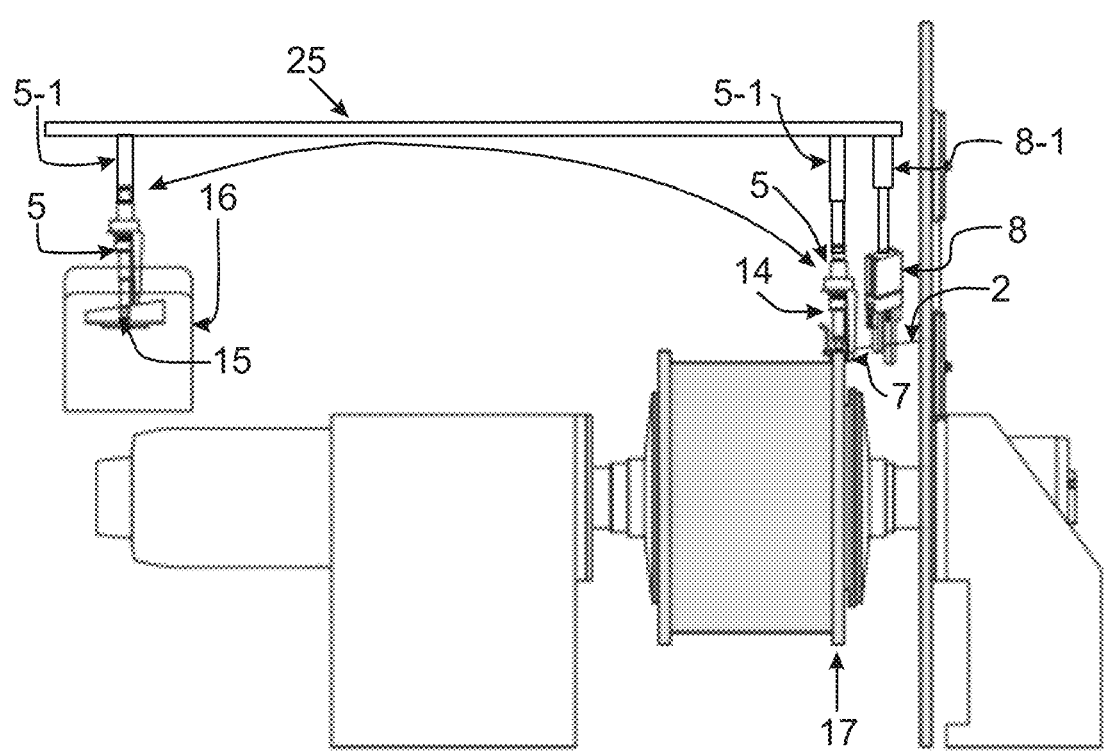

After the gripper 8 has gripped onto the optical fiber 2, the attachment device 5 collects a piece of tape from the tape supply station 16, configured to cut and supply pieces of tape, with the collector 15. In order to attach the optical fiber 2 to the reel and cut the optical fiber 2 with a single motion, the collector 15 of the attachment device 5 is then pressed against the optical fiber 2 and a larger first flange 17 of the first reel 3. In other words, the attachment device 5 presses the collector 15, having the piece of tape, against the optical fiber 2 and the larger first flange 17 of the full first reel 3 with such a force that the telescopic (for instance) spring-biased frame 14 of the attachment device 5 compresses sufficiently to move the cutter 7 past the collector 15 thus cutting the optical fiber 2. The attachment device 5 and may comprise an actuator 5-1 for moving the attachment device 5 and for pressing the collector 15 against the optical fiber 2 and the reel. The gripper 8 may also comprise an actuator 8-1 for moving the gripper 8 towards and away from the optical fiber 2. Said actuators 5-1, 8-1 may be, for instance, pneumatic cylinders arranged movably on a rail 25, as illustrated in FIGS. 5a and 5b.

When the optical fiber 2 has been attached to the full first reel 3 and cut, the gripper 8, still holding the free-end of the optical fiber 2, moves away from the full first reel 3, so as to allow the full first reel 3 to be moved away from the exchange area 6 for moving the full first reel 3 on to a next processing sequence. One possible way to move the full first reel 3 the next processing sequence is illustrated in FIGS. 6a and 6b.

Figure 6A:
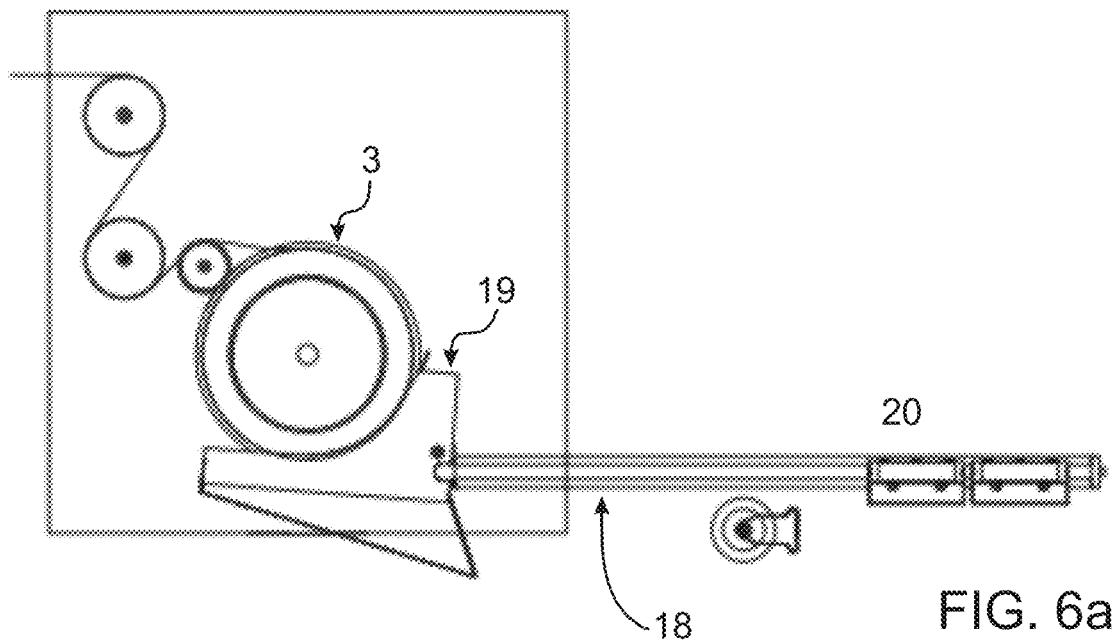
FIGS. 6a and 6b are side-view drawings illustrating the extraction of a full first reel from the single-reel winding device.
Figure 6B:
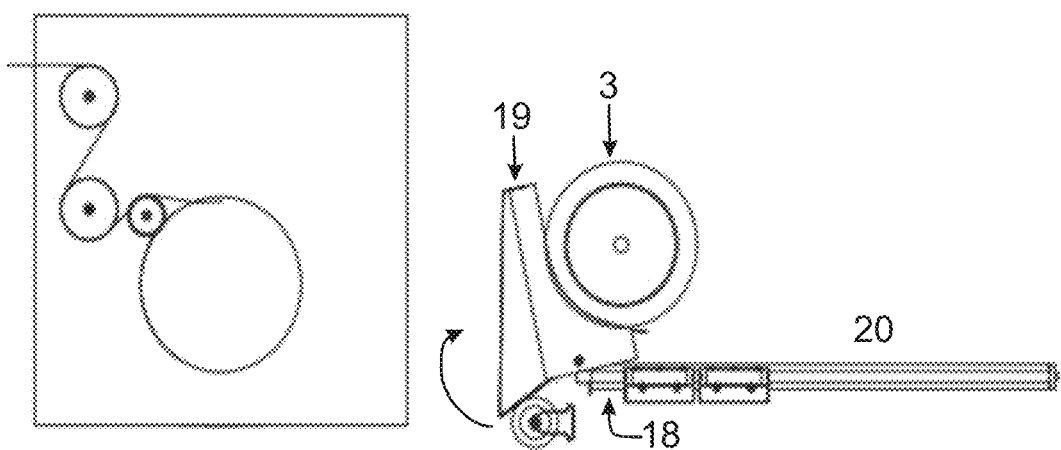

FIGS. 6a and 6b are side-view drawings illustrating the extraction of a full first reel 3 from the single-reel winding device. In FIG. 6a, a first extension arm 18, having an extracting end 19, extends from a downstream side of the production line 20 towards the full first reel 3 in such a way that the extracting end 19 is arranged under the full first reel 3. The winder 4 (not shown in FIGS. 6a and 6b) then detaches itself from the full first reel 3 by moving the two rotatable pins 10, 11 away from each other thus releasing the full first reel 3 onto the extracting end 19 of the first extension arm 18 which then retracts back to the downstream side of the production line 20 with the first full reel 3. When the first extension arm 18 has been retracted back to the production line, the extracting end 19 tilts towards the downstream side of the production line 20 due to contact with a roller or wheel arranged below the extension arm 18 in order to move the full first reel 3 to the production line, as is illustrated in FIG. 6b.

Figure 7A:
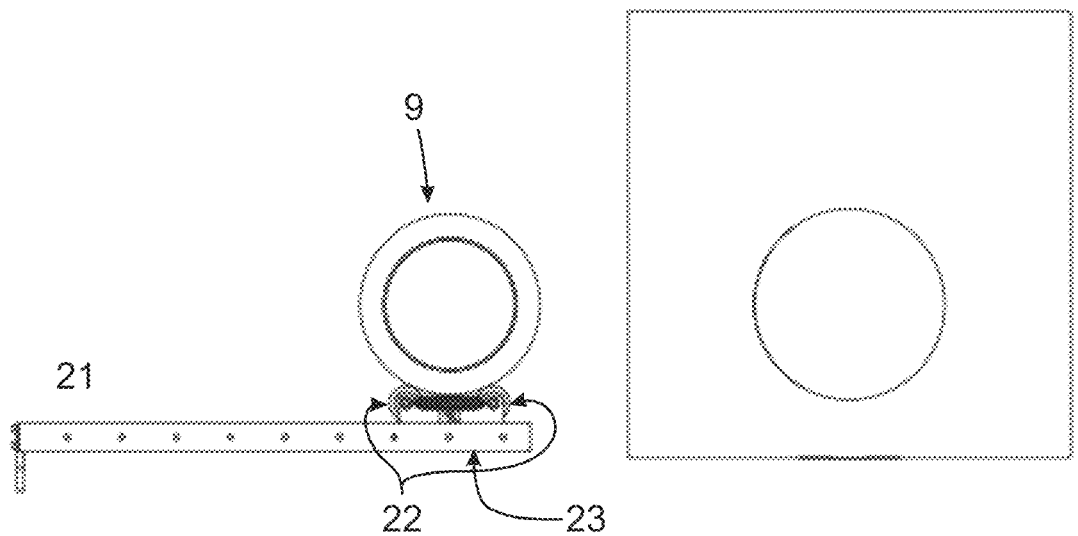
FIGS. 7a and 7b are side-view drawings illustrating the insertion of an empty second reel to the single-reel winding device.
Figure 7B:
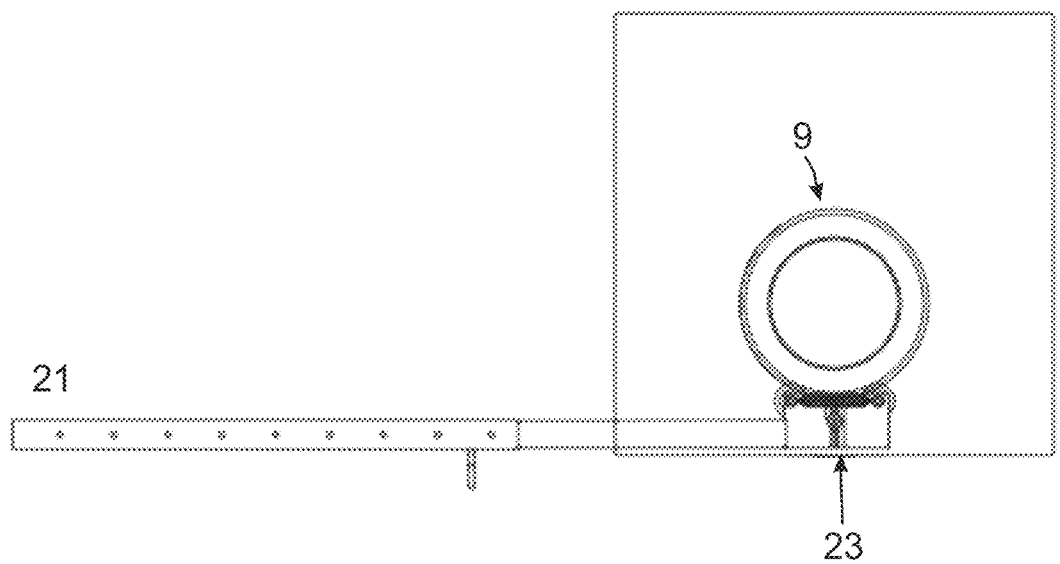

FIGS. 7a and 7b are side-view drawings illustrating the insertion of an empty second reel 9 to the single-reel winding device. The winder 4 (not shown in FIGS. 7a and 7b) is arranged to, after removal of the full first reel 3, move the second empty reel 9 to a position where a flange of the second empty reel 9, which flange is located closest to the distributor wheel 1, is located between the distributor wheel 1 and the gripper 8, such that the attachment device 5 can attach the optical fiber 2 to the flange. In other words, after extracting the full first reel 3, the winder 4 is moved back to the exchange area 6 and an empty second reel 9 is rotated to a suitable position for winding in an upstream side of the processing line 21, as shown in FIG. 7a. The empty second reel 9 is rotated, for instance, by using rollers 22 arranged in a second extension arm 23 in order to obtain a position where holes in at least one of the flanges of the second reel 9 are rotated to a correct position to engage the corresponding pin 10 or 11 of the winder. The second extension arm 23, having the empty second reel 9 at the extending end, then extends from the upstream side of the production line 21 towards the exchange area 6, as shown in FIG. 7b.

Figure 8A:
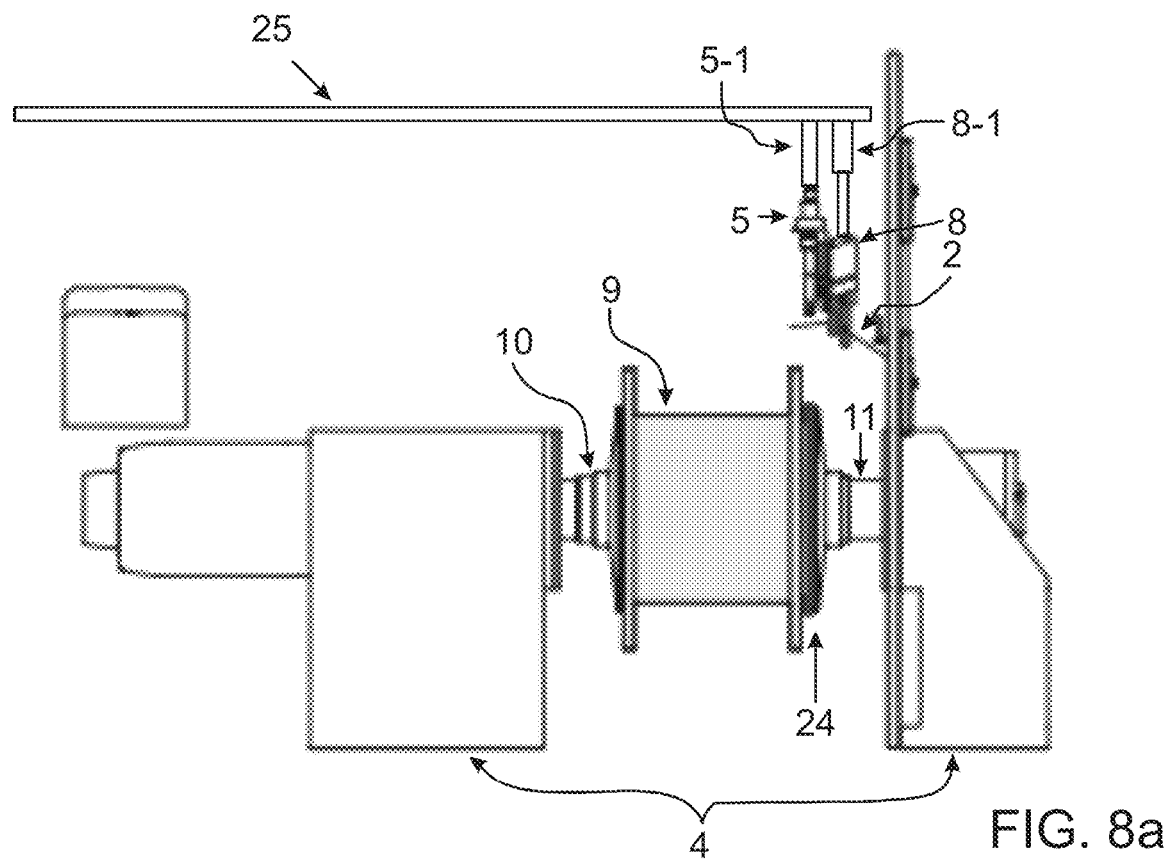
FIGS. 8a and 8b are front-view drawings illustrating the attachment of the optical fiber to an empty reel.
Figure 8B:
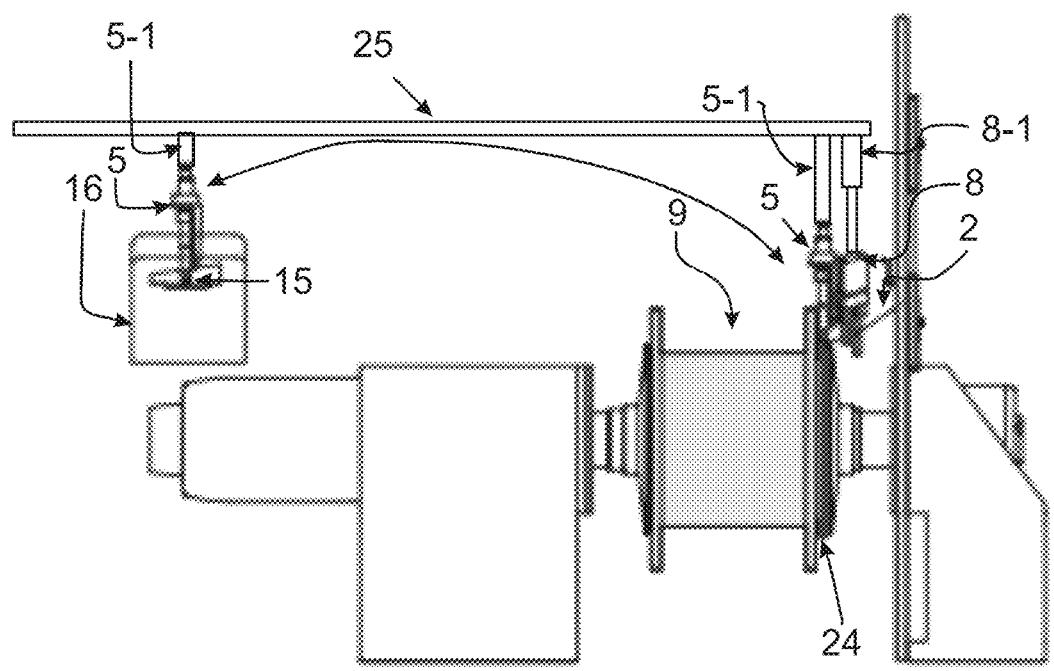

FIGS. 8a and 8b are front-view drawings illustrating the attachment of the optical fiber 2 to the empty second reel 9. Once the empty second reel 9 is in the exchange area 6, the two pins 10, 11 of the winder 4 move towards each other in order to attach onto the empty second reel 9, as shown in FIG. 8a. The gripper 8, still holding the free-end of the optical fiber 2, is then lowered towards a smaller second flange 24 of the empty second reel 9 in order to position the free-end of the optical fiber against the smaller second flange 24 of the second reel 9, as shown in FIG. 8b. The attachment device 5 then collects a piece of tape from the tape supply station 16 with the collector 15, moves back to the empty second reel 9, arid presses the collector 15, with said piece of tape, against the optical fiber and the second smaller flange 24 of the empty second reel 9 in order to attach said optical fiber to said flange.

The collector 15 is pressed against the optical fiber 2 and the second smaller flange 24 preferably with such a force that the spring-biased frame 14 is not compressed to an extent where the cutter 7 moves past the collector 15 and cuts the optical fiber 2. In an example, an actuator may be configured to limit the compression of the spring-biased frame 14 of the attachment device 5 when the collector 15 of the attachment device 5 is pressed against the optical fiber 2 and the empty second reel 9 in order to attach the optical fiber 2 to the empty second reel 9. In said example, the actuator may be a pneumatic cylinder and a pressure, which is smaller than the maximum spring force of the spring-biased frame 14 of the attachment device 5, may be provided to the pneumatic cylinder. This allows the attachment of the fiber to the empty second reel 9 as the spring-biased frame 14 is not fully compressed and the cutter 7 does not move past the collector and cut the fiber 2.

After the fiber 2 has been attached to the empty second reel 9, the gripper 8 releases the fiber and moves away from the empty second reel 9. The optical fiber 2 is then first wound onto the second smaller flange 24 for a predetermined amount of rounds before the reel is moved sideways in order to move the optical fiber 2 to a surface between the two larger first flanges 17 of the reel to continue winding the optical fiber 2 on said surface. The first larger flange 17 of the reel may comprise an opening for allowing the optical fiber 2 to run past said flange.

In FIGS. 5a, 5b and 8a, 8b, the attachment device 5, comprising the cutter 7, comprises only one actuator 5-1 for controlling the movement of both the attachment device and the cutter. Another possibility is to provide one actuator for the attachment device 5 and another actuator for the cutter 7 in order to control the movement of said attachment device and said cutter separately.

It will be obvious to a person skilled in the art that, as the technology advances, the inventive concept can be implemented in various ways. The invention and its embodiments are not limited to the examples described above but may vary within the scope of the claims.

The invention claimed is:

1. An equipment for attaching an optical fiber to a reel, the equipment comprising:
 a tape supply station configured to cut and supply pieces of tape;

an attachment device having a spring-biased frame with a collector for collecting a piece of tape from the tape supply station for attaching the optical fiber to a reel;

an actuator arranged for moving the attachment device and for pressing the collector having said piece of tape against the optical fiber and the reel in order to attach said optical fiber to said reel; and a cutter for cutting the optical fiber, where said cutter is a blade arranged alongside the spring-biased frame of said attachment device, in order to protrude out past the collector, when the spring-biased frame is compressed, and configured to cut the optical fiber with a single motion when the collector of the attachment device is pressed against the optical fiber and the reel.

2. The equipment for attaching an optical fiber to a reel according to claim 1, wherein said collector comprises:

a suction pad for collecting the piece of tape from the tape supply station.

3. The equipment for attaching an optical fiber to a reel according to claim 1, wherein the equipment comprises:

a gripper for gripping onto the optical fiber and keeping the optical fiber stationary during attaching and cutting of the optical fiber, and during a time when a first, reel full of wound optical fiber is removed from an exchange area and a second, reel that is empty of optical fiber is provided to the exchange area in order to continue winding of the optical fiber.

4. The equipment for attaching an optical fiber to a reel according to claim 3, wherein the gripper comprises:

movable jaws arranged to open and to close for gripping onto the optical fiber; and an actuator for moving the gripper towards the optical fiber and away from the optical fiber.

5. The equipment for attaching an optical fiber to a reel according claim 1, wherein the equipment comprises:

a distributor wheel configured for distributing optical fiber to a first reel for winding the distributed optical fiber; and a winder, arranged movably on guide tracks, for revolving the first reel around a center axis of the first reel and for moving the first reel along the center axis between different positions in order to wind the distributed optical fiber onto the first reel, and for moving the first reel to an exchange area when the first reel is full.

6. The equipment for attaching an optical fiber to a reel according to claim 1, in combination with:

the reel configured for winding an optical fiber.

7. The equipment for attaching an optical fiber to a reel according to claim 1, in combination with:

a first reel for winding the attached optical fiber; and a second reel which is configured to replace the first reel when the first reel is fully wound with the wound optical fiber.

8. The equipment for attaching an optical fiber to a reel according to claim 1, in combination with:

an optical fiber to be attached by the equipment to the reel.

9. The equipment for attaching an optical fiber to a reel according to claim 1, in combination with:

an optical fiber to be attached by the equipment to the reel and to a second reel.

* * * * *